United States Patent [19]

Sadiq

[11] Patent Number: 5,960,424
[45] Date of Patent: Sep. 28, 1999

[54] METHOD AND SYSTEM FOR MANAGING COMPUTER DATABASE CONNECTIONS

[75] Inventor: Waqar Sadiq, Rochester Hills, Mich.

[73] Assignee: Electronic Data Systems Corporation, Plano, Tex.

[21] Appl. No.: 09/016,868

[22] Filed: Jan. 30, 1998

Related U.S. Application Data

[60] Provisional application No. 60/065,400, Nov. 13, 1997.

[51] Int. Cl.[6] .................................................... G06F 17/30
[52] U.S. Cl. ................................................ 707/2; 707/10
[58] Field of Search ...................... 707/1–10, 100–104, 707/200–206; 345/333, 335, 347; 709/107

[56] References Cited

U.S. PATENT DOCUMENTS

| | | | |
|---|---|---|---|
| 5,566,330 | 10/1996 | Sheffield | 707/4 |
| 5,752,018 | 5/1998 | Shelffield | 707/2 |
| 5,752,027 | 5/1998 | Familiar | 707/103 |
| 5,832,481 | 11/1998 | Sheffield | 707/4 |
| 5,844,554 | 12/1998 | Geller et al. | 345/333 |
| 5,878,411 | 3/1999 | Burroughs et al. | 707/4 |

Primary Examiner—Ruay Lian Ho
Attorney, Agent, or Firm—L. Joy Griebenow; Baker & Botts L.L.P.

[57] ABSTRACT

The invention comprises a method and system for managing computer database connections. In accordance with the method of the invention, a database operation request is received for a first database. The first database comprises a first database type and the first database operation request comprises at least a portion of a first transaction A pool of interface objects is maintained, each interface object comprising an interface to a database of the first database type. Interface object status information is maintained, either by the interface object itself or externally, indicating whether or not the interface object is connected to the first database and whether or not the interface object is currently being used for a transaction. If a first interface object is connected to the first database and is assigned to the first transaction, then the first database operation request is processed using that first interface object. If no interface object is both connected to the first database and assigned to the first transaction and if a second interface object is connected to the first database but not currently being used for a transaction, then the second interface object may be assigned to the first transaction, the interface object status for the second interface object updated, and the first database operation request processed using the second interface object.

20 Claims, 2 Drawing Sheets

METHOD AND SYSTEM FOR MANAGING COMPUTER DATABASE CONNECTIONS

RELATED APPLICATIONS

This application claims the benefit of United States provisional application Ser. No. 60/065,400, which was filed on Nov. 13, 1997.

TECHNICAL FIELD OF THE INVENTION

This invention relates generally to object-oriented programming and more particularly to a method and system for managing computer database connections.

BACKGROUND OF THE INVENTION

Software developers have begun considering the implementation of large distributed object systems. In such systems, distributed objects may be stored in various types of databases such as relational databases or hierarchical databases. In addition, these particular database types may be implemented using different types of software packages such as Oracle, Sybase, etc. Interaction with multiple database types presents several problems. First, the interaction with a particular type of database may be using a non-standard interface that is very specific to that database. Even if a standard interface is used, a particular type of database may not support the same functions as are supported by other types of databases. Varying interfaces present a challenge to the developers of distributed objectoriented systems because varying interfaces could require the handling of special cases in the code if the system is not implemented properly. Because large distributed object systems may include a number of different types of legacy database systems, these problems may be magnified in a distributed object environment.

Second, database software sellers normally price their software based upon the number of connections that may be simultaneously made to a database at any one time. These database licenses are frequently expensive. Thus, a certain number of database licenses will ordinarily be purchased to share among multiple applications. Database licenses should desirably be shared in as efficient a manner as possible so as to avoid having to purchase an excess number of database licenses. In a distributed object system, sharing of databases presents further problems in maintaining data consistency while handling transactions which may make multiple changes to a database. In addition, sharing database connections means that database connections must be established and then torn down so that the connection may be used by different processes. Because database connection and disconnection consumes significant computing resources, managing this process to improve efficiency is important.

SUMMARY OF THE INVENTION

The invention comprises a method and system for managing computer database connections. Although the method and system may be used in many different types of systems, it is advantageously employed in distributed object systems. One aspect of the invention is a method for managing computer database connections wherein a first database operation request for a first database is received. The first database comprises a first databasetype while the first database operation request comprises at least a portion of a first transaction. A pool of interface objects are maintained, each interface object comprising an interface to a database of the first database type. For each of these interface objects interface object status information is maintained indicating whether or not the interface object is connected to the first database, and whether or not the interface object is currently being used for a transaction. If a first interface object is connected to the first database and is assigned to the first transaction, then the first database operation request will be processed using the first interface object. If no interface object is both connected to the first database and assigned to the first transaction, and if a second interface object is connected to the first database but not currently being used for a transaction, then the second interface object will be assigned to the first transaction, its status information updated, and it will be used to process the first database operation request.

The invention has several important technical advantages. The invention employs interface objects to interface with database software. Because objects are used, inheritance may be used to create a common interface to all databases that an object-oriented system interfaces with. Thus, database software packages can be easily added or deleted from the distributed object system without significant changes to the distributed object system software. The invention also allows efficient sharing of database connections. The invention makes use of connections that have already been made to databases but are not currently being used for transactions. These connections are not torn down unless necessary for use by another process, thus conserving computing resources for connection and disconnection of databases.

The invention advantageously assigns a particular database interface object to a particular transaction, thus allowing all operations on a database for a particular transaction to flow through the same database connection. This aspect of the invention advantageously solves most problems with data consistency where a transaction makes multiple changes to a particular object or database. The invention should reduce the number of database licenses that need to be purchased for a given database software package used in a distributed object system. In addition, the invention should allow faster handling of database operation requests.

BRIEF DESCRIPTION OF THE DRAWINGS

For a more complete understanding of the present invention and the advantages thereof, reference is now made to the following descriptions, taken in conjunction with the accompanying drawings, in which.

DETAILED DESCRIPTION OF THE INVENTION

Figure 1:
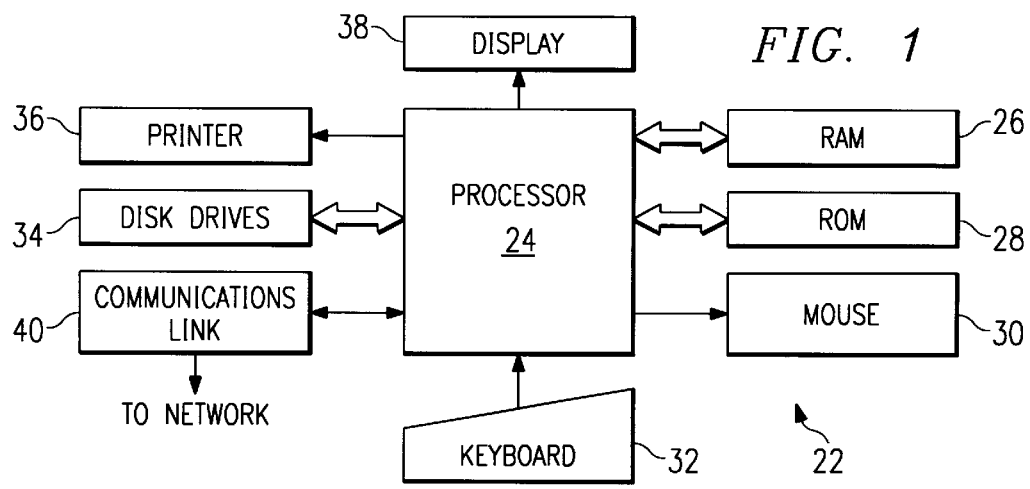
FIG. 1 illustrates an exemplary general purpose computer that may be used to implement the present invention.
Figure 2:
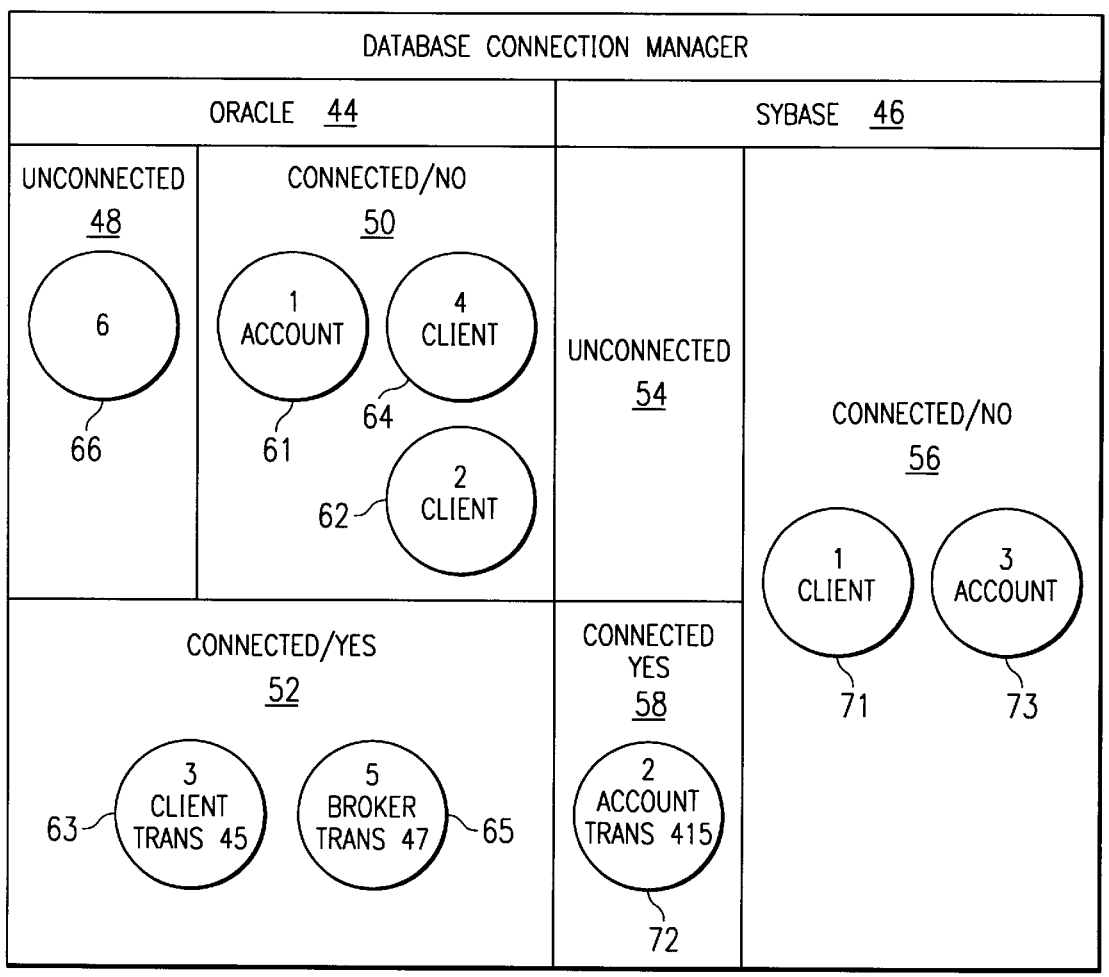
FIG. 2 illustrates an exemplary database connection manager constructed in accordance with the invention.
Figure 3:
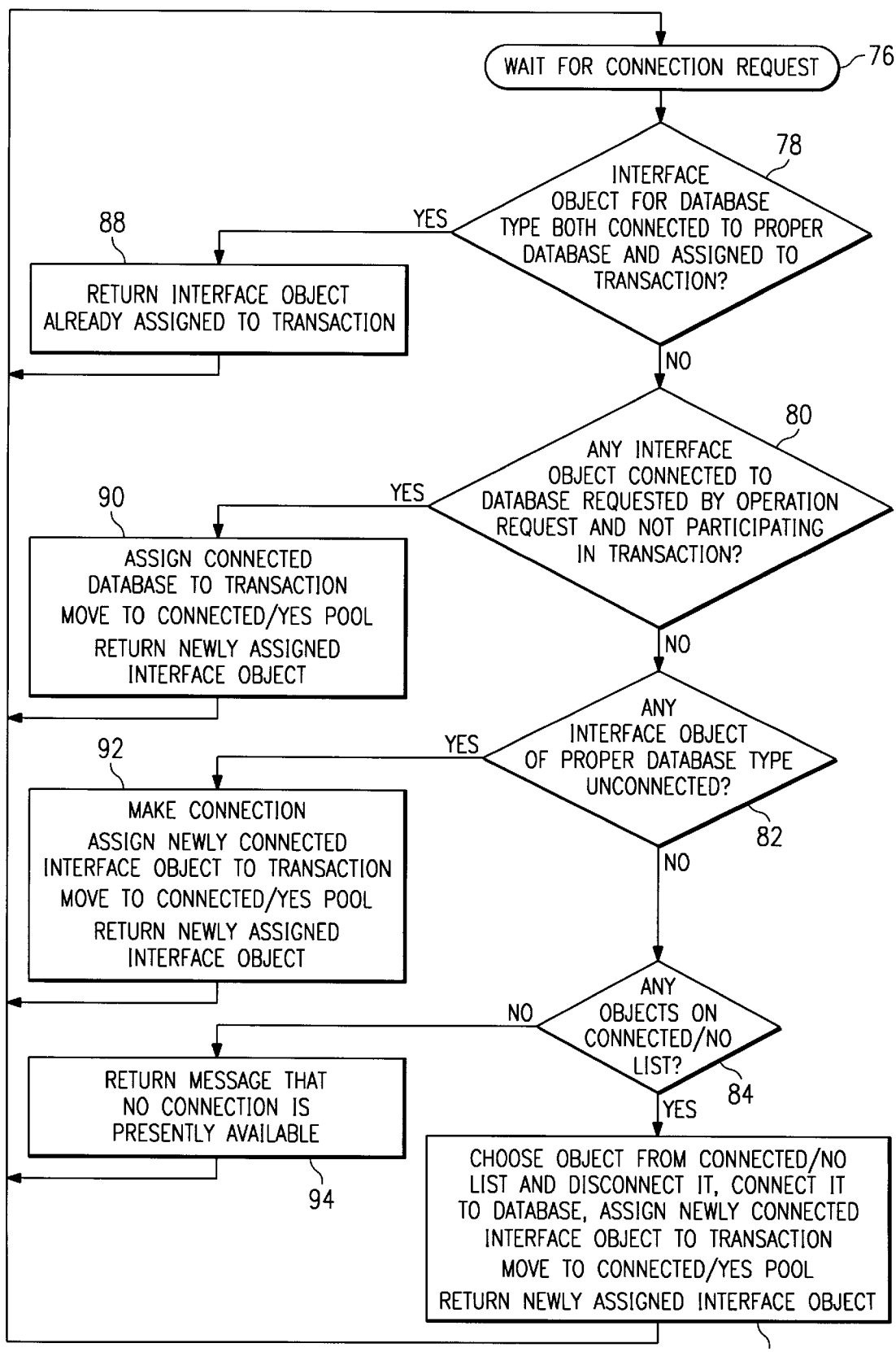
FIG. 3 illustrates a flow chart describing a portion of the operation of an exemplary database connection manager constructed in accordance with the invention.

The preferred embodiment to the present invention and its advantages are best understood by referring to FIGS. 1–3 of the drawings, like numerals being used for like and corresponding parts of the various drawings.

FIG. 1 illustrates a general purpose computer 22 that may be used in a distributed object system created in accordance with the invention. The general purpose computer 22 may be used to execute distributed applications and/or distributed system services in accordance with the invention. General purpose computer 22 may be adapted to execute any of the well-known OS 2, UNIX, MAC-OS, and WINDOWS operating systems or other operating systems. General purpose computer 22 comprises processor 24, random access memory (RAM) 26, read-only memory (ROM) 28, mouse 30, keyboard 32, and input/output devices such as disk drives 34, printer 36, display 38, and communications link 40. The present invention includes programs that may be stored in RAM 26, ROM 28, or disk drives 34 and may be executed by processor 24. Communications link 40 connects to a computer network but could be connected to a telephone line, an antennae, a gateway, or any other type of communications link. Disk drives 34 may include a variety of types of storage media such as, for example, floppy disk drives, hard disk drives, CD ROM drives, or magnetic tape drives. Although this embodiment employs a plurality of disk drives 34, a single disk drive 34 could be used without departing from the scope of the invention. FIG. 1 only provides one example of a computer that may be used with the invention. The invention could be used on computers other than general purpose computers, as well as on general purpose computers without conventional operating systems.

FIG. 2 illustrates an exemplary database connection manager 42 constructed in accordance with the teachings of the invention. Database connection manager 42 comprises one or more objects used to manage database connections between processes in a distributed object system, and particular database types. Database connection manager 42 could comprise a separate object for each database type or a series of objects that collectively manage multiple database types. Any of these architectures or other architectures could be used for database connection manager 42 without departing from the scope of the invention.

The term "database type" refers to a particular database structure and/or interface as defined by a particular database software package. For example, a relational database using the Oracle software package may be one database type while a relational database using the Sybase software package may be another database type, even if both databases use the SQL standard. Other database software packages may also be used and may constitute different database types. In other words, databases with different interfaces have a different database type. In addition, databases with identical interfaces but which require different connection licenses may also be different database types. In addition, where multiple copies of a software package are used in distributed object system, these multiple copies could be considered to be of a different type as well. For example an Oracle relational database on a first computer 22 may be a different database type than an Oracle relational database on a second computer 22. In general, then, a database type within the meaning of this application refers to a software package to which database connection manager 42 manages a collection of one or more interfaces to the database.

The present invention employs an abstraction to serve as a common interface to databases of many different database types. This abstraction allows different processes communicating with different databases to do so using a common set of messages. However, unique interfaces could be developed for each database type without departing from the scope of the invention.

For each database type, the database connection manager 42 maintains a pool 44, 46 of interface objects. In the example illustrated in FIG. 2, an Oracle pool 44 and a Sybase pool 46 of interface objects is maintained. The Oracle and Sybase software packages are used as examples and other software packages may be used or these software packages not used without departing from the scope of the invention. In addition, if multiple copies of software packages are used on, for example, different computers, then a pool of interface objects could be maintained separately for each copy. Thus, there could be multiple Oracle interface object pools, for example.

Database connection manager 42 manages each pool 44, 46 of interface objects. Each interface object corresponds to a license for a particular database. Thus, in the example Oracle pool 44, there are six interface objects 61–66, corresponding to six licenses to use a copy of the Oracle software package simultaneously. When each interface object is created, it registers itself with database connection manager 42 so that database connection manager 42 knows that this interface object can now handle database operation requests.

When an object or process needs to perform a database operation, it will request a connection from database connection manager 42. The request will preferably identify the database to which the request is directed and the distributed object system transaction with which the request is associated. In a distributed object environment, a transaction refers not to an individual transaction with a database but to an object transaction comprising a unit of work such that all of the work is either made permanent as a group or rolled back together. Thus, a particular object transaction may involve one or many database operations, some with a single database and others with multiple databases.

Database connection manager 42, for a particular database type, as noted above, maintains a pool of interface objects where each interface object may allow a separate connection to the database. In this embodiment, database connection manager 42 divides the pool of interface objects into three separate logical groups. Here, those logical groups comprise those interface objects that are currently unconnected to any database, those interface objects connected to a database but not participating in a transaction, and those interface objects connected to a database and also currently participating in a transaction.

In this example embodiment, these logical groups are implemented as three linked lists for each database type. Thus, in the embodiment illustrated in FIG. 2, for the Oracle pool 44 of interface objects 61–66, an unconnected list 48, a connected but not engaged in a transaction list 50, and a connected and engaged in a transaction list 52 are each maintained. Data structures other than linked lists could be used without departing from the scope of the invention. In addition, a particular pool of interface objects such as the Oracle pool 44 could be divided into more or less categories of interface objects without departing from the scope of the invention. Moreover, rather than dividing the interface objects into three physical linked lists, a single linked list (or other data structure) could be used with each grouping of interface objects being logical rather than actual. Each interface object may be categorized simply by maintaining status information indicating whether or not the interface object is currently connected to a database and whether or not the interface object is currently being used for a transaction or not. Such information may be maintained by each interface object or by database connection manager 42.

In this embodiment, database connection manager 42 seeks to use the same database connection to handle all interactions with a particular database for a particular transaction. A particular transaction may access two different databases of the same database type, thus using two database connections, one for each database of the same database type. For example, a particular transaction could make use of both the client and broker Oracle databases in the example illustrated in FIG. 2. In addition, database connection manager 42 seeks to avoid the overhead required to connect and disconnect interface objects to databases.

The operation of database connection manager 42 can best be understood by referring to FIG. 3. Before describing this operation, however, it will be helpful to further describe the exemplary database connection manager illustrated in FIG. 2. As noted, database connection manager 42 handles interfaces to Oracle databases and Sybase databases. In this embodiment, there are three types of databases which each software package may access. The Oracle software package includes a client database, a broker database, and an account database for an exemplary stock brokerage distributed object system. Similarly, the Sybase software package may interface with a client database, broker database and/or account database created using the Sybase software package.

Each interface object is labeled with a number corresponding to the interface object number for that software package. In the present state of database connection manager 42, there are six interface object 61–66 for the oracle pool 44 of interface objects. Object 66 is currently unconnected to any database. Interface object 61, interface object 62, and interface object 64 are currently connected to databases with object 61 being connected to the account database and interface objects 62 and 64 being connected to the client database. These interface objects 61, 62 and 64, however, are currently not being used to process a transaction. Interface objects 63 and 65 are connected, respectively, to the client database and broker database and are being used to process transactions. Interface object 63 is being used to process transaction number 45 while interface object 65 is being used to process transaction 47.

Similarly, the Sybase pool 46 of interface objects comprises three interface objects 71–73. In the current state of database connection manager 42, the Sybase pool 46 of interface objects comprises two interface objects connected to a database but not currently being used for a transaction. Interface object 71 is connected to a client database while interface object 73 is connected to an account database. Interface object 72 is connected to the account database and is currently being used to process transaction number 415. The number of interface objects chosen for a particular software package may depend upon the cost of licenses to that database and the number of connections desirable for the most efficient operation of the system taking into account the cost.

FIG. 3 illustrates a flow chart describing the operation of database connection manager 42 of FIG. 2. In step 76, database connection manager 42 waits for a connection request. Database connection manager 42 runs on a computer that may be, for example, a general purpose computer such as general purpose computer 22. Database connection manager 42 will often be used in a distributed object system where multiple computers run multiple processes that may access multiple databases. The computers may include a network of computers such as general purpose computer 22. Accordingly, the connection request received in step 76 may be from the same computer (or computers) on which database connection manager 42 is running or from a different computer. A connection request is merely a request to connect with a database and will normally correspond to a database operation request. As discussed, in a distributed object system, each database operation request comprises all or a portion of a particular transaction.

In step 78, it is determined whether there is an interface object in the pool for the particular database type that is both connected to the proper database and assigned to the transaction with which the database operation request is associated. Accordingly, suppose that the operation request received in step 76 was to access the broker database in the Oracle software package for transaction 43. Using the current state of the system illustrated in FIG. 2, the inquiry in step 78 would determine that there is no interface object currently connected to the broker database in the Oracle software package handling transaction 43. Although interface object 65 is connected to the Oracle broker database, that interface object 65 is currently handling a separate transaction and should not be used for transaction 43. If, however, interface object 65 was handling transaction 43, then database connection manager 42 would proceed to step 88 where it would return the identity of interface object 65, which was already assigned to transaction 43, to the process that generated the database operation request. Database connection manager 42 would then wait for the next connection request in step 76.

The discussion of FIG. 3 thus far has assumed that only one version of a particular software package is running in a particular distributed object system. However, three different computers could be running three different copies of the Oracle software package. As discussed above, a single pool could be maintained for all Oracle databases but most likely, a separate pool of interface objects would be maintained for each of the copies of the Oracle database maintained in the system.

Returning to step 78, if there is no interface object already connected to the proper database and assigned to the connection, then in step 80 it is determined whether any interface object is connected to the database corresponding to the database operation request but not currently participating in a transaction. Thus, for the example where a database operation request is received for the Oracle broker database in transaction number 43, database connection manager 42 would consult the pool of interface objects connected to the Oracle database but not participating in a transaction 50 to determine whether there is any interface object currently connected to the broker database. In this example, no interface object 61–66 for the oracle database is currently connected to the broker database but not participating in a transaction.

Accordingly, the database connection manager will proceed to step 42. If, however, an interface object was already connected to the broker database and appeared on the list 50 of interface objects connected to a database but not participating in a transaction, then database connection manager 42 would proceed to step 90 and assign that interface object that was so connected to transaction number 43. That interface object would be moved to the list 52 of those interface objects connected and participating in a transaction and the newly assigned interface object would be returned to the process that generated the database operation request. If one of the alternative embodiments is chosen, such as that where a single list of interface objects is maintained and pools are logical rather than actual pools, then rather than moving the newly connected interface object to a pool, its status information would merely be updated to reflect its new status.

Returning to step 82, if no interface object was found that was already connected to the database but not participating in a transaction, then database connection manager would determine whether there are any interface objects of the proper database type that are unconnected. In the example where a request for the Oracle broker database was received, database connection manager 42 would consult the list 48 of Oracle interface objects that are currently unconnected.

Here, interface object 66 is unconnected so database connection manager 42 would proceed to step 92 where it would connect interface object 66 to the Oracle broker database. Interface object 66 would be assigned to transaction 43 and moved to the pool 52 of those interface objects connected to a database and currently participating in a transaction. Interface object 66 would then be returned to the process that generated the database operation request for use in satisfying the request. Again, if an alternative embodiment is being used such as one where a single group of interface objects is maintained, then the status information for interface object 66 would be updated without moving the interface object from list to list.

If, however, there were no interface objects on the list 48 of interface objects currently unconnected to a database, then database connection manager 42 would proceed to step 84. In step 84, database connection manager would determine whether there are any objects currently on the list 50 of interface objects connected to a database but not currently participating in a transaction. If no objects appear on this list and database connection manager 42 has reached step 84, then there are no interface objects currently available to satisfy the transaction request. Thus, in step 94 a message is returned to the process generating the database operation request that no connection is currently available. Alternatively, database connection manager 42 could wait for an interface object to become available rather than returning a message to the process generating the connection request that no connection is presently available. Either method could be used without departing from the scope of the invention.

If there are objects on the list 50 of those interface objects connected to a database but not currently participating in a transaction, then in step 86, an object is chosen from this list to handle the transaction request. In the example discussed above, one of the objects would be chosen from list 50 and disconnected from the database. Then, this interface object would be connected to the Oracle broker database, assigned to transaction number 43, and moved from the list 50 of objects connected but not participating in a transaction to the list 52 of those objects connected to a database and currently participating in a transaction. The newly assigned interface object would be returned to the process generating the database operation request for use in satisfying the request.

Several possible methods may be used to choose from the list 50 of those objects connected to a database but not currently participating in a transaction to disconnect and use for the new connection. First, one of the members of list 50 could be chosen at random. Second, each interface object could maintain a time stamp identifying the time at which the interface object was last used to process a database connection request and the interface object that was least recently used to process any database operation request could be chosen.

Third, because multiple interface objects may be connected to the same database while handling requests that are a part of different transactions, the list 50 may include multiple interface objects connected to the same database. A time stamp could be maintained for each database rather than each interface object identifying when each database was last used to process a database operation request. Then, an interface object could be chosen from list 50 that was connected to the database that was least recently used to process a database operation request.

Fourth, because multiple connections to the same database may be advantageously maintained, a measure of the activity level could be maintained for each interface object. The activity level may take into account the number of times the interface object has been used during a particular time period and the length of time that the interface object has been connected to a particular database. The activity level could be chosen to be directly proportional to the number of times it has been accessed during a particular time period and inversely proportional to the length of time that the interface object has been connected to a particular database. The object chosen from list 50 could be that with the lowest activity level as compared to other interface objects on list 50. The measure of activity level might take into account the number of times an object has been used since it was connected to a particular database or only recent accesses. Other methods could be used to determine which object to choose for disconnection from list 50 in step 86 without departing from the scope of the invention.

When database connection manager 42 receives a notification that a transaction has completed, all interface objects on the list of objects connected to a database object and participating in a transaction are removed from that list and placed on the list of those objects connected to a database but not participating in a transaction. In an alternative embodiment, the status information of the interface object is simply updated to reflect that it is not currently participating in a transaction. By maintaining the connection to the database even after a transaction completes, this connection may be used for a subsequent transaction generating an operation request for the same database without incurring the overhead of connecting to the database. Because there is a high probability that a database used recently for a transaction will be used for another transaction in the near future, this aspect of the invention provides for the efficient handling of database connections.

Another alternative to maintaining three lists of interface objects is to initialize all interface objects to be connected to any of the databases that use that type of interface object and place the initialized connections on a list of interface objects connected to a database but not currently participating in a transaction. A separate list could be maintained for those interface objects connected to a database and currently participating in a transaction. Thus, this alternative embodiment eliminates the list of interface objects currently unconnected to any database. Only two lists are then maintained. Such an embodiment would operate similarly to database connection manager 42 as described in FIG. 3, except that steps 82 and 92 would be eliminated and step 84 would directly follow step 80. As a further refinement of this alternative embodiment, a single list of interface objects could be maintained with each interface object maintaining its own status information but all interface objects would be initialized to be connected with one of the databases having the database type supported by the interface object.

To summarize the operation of the embodiment illustrated in FIG. 2, the database connection manager first determines whether there is an interface object already connected to the requested database and participating in the same transaction. If so, then that object is returned. If no such object exists, then an object is preferably chosen that is already connected to the database but is not participating in a transaction. The choice of such an object avoids the overhead of making a database connection. If an object of this type cannot be found, then one can be taken out of the pool of those interface objects that is not currently connected to any database. Finally, if none of those options are available, then a database that is not participating in a transaction but is already connected to a database is disconnected, reconnected to the proper database, and assigned to handle the particular operation request. If no such object is available, then a no connection available message is returned.

Although the present invention has been described in detail, it should be understood that various changes, substitutions, and alterations can be made hereto without departing from the spirit and scope of the invention as defined by the appended claims.

What is claimed is:

1. A method for managing computer database connections, comprising:
   receiving a first database operation request for a first database, the first database comprising a first database type, the first database operation request comprising at least a portion of a first transaction;
   maintaining a pool of interface objects, each interface object comprising an interface to a database of the first database type;
   maintaining, for each interface object, interface object status information indicating whether or not the interface object is connected to the first database and whether or not the interface object is currently being used for a transaction;
   if a first interface object is connected to the first database and is assigned to the first transaction, then processing the first database operation request using the first interface object; and
   if no interface object is both connected to the first database and assigned to the first transaction and if a second interface object is connected to the first database but not currently being used for a transaction, then assigning the second interface object to the first transaction, updating the interface object status information for the second interface object, and processing the first database operation request using the second interface object.

2. The method of claim 1, further comprising:
   if no interface object is both connected to the first database and assigned to the first transaction and if no interface object is connected to the first database but not currently being used for a transaction, then selecting a third interface object that is connected to a database of the first database type but not currently being used for a transaction, disconnecting the third interface object from the database to which it was connected, connecting the third interface object to the first database, assigning the third interface object to the first transaction, updating the interface object status information for the third interface object, and processing the first database operation request using the third interface object.

3. The method of claim 2, wherein the third interface object comprises the interface object connected to a database of the first type but not currently being used for a transaction and that was least recently used to process any database operation request.

4. The method of claim 2, wherein the third interface object comprises an interface object selected randomly from those interface objects connected to a database of the first type but not currently being used for a transaction.

5. The method of claim 2, wherein the third interface object comprises the interface object that was connected to a database of the first type but not currently being used for a transaction and that was connected to a database that least recently received any database operation request.

6. The method of claim 2, wherein the third interface object comprises the interface object that was connected to a database of the first type but not currently being used for a transaction and, of interface objects satisfying this criteria, has the lowest activity level, where activity level is proportional to the number of times the interface object has been used during a particular time period and inversely proportional to the length of time that the interface object has been connected to a particular database.

7. The method of claim 1, further comprising:
   if no interface object is both connected to the first database and assigned to the first transaction, if no interface object is connected to the first database but not currently being used for a transaction, and if there is at least one interface object operable to be connected to a database of the first database type but not currently connected to any database and not currently being used for a transaction, then connecting a fourth interface object, that is not currently connected to any database and not currently being used for a transaction, to the first database, assigning the fourth interface object to the first transaction, updating the interface object status information for the fourth interface object, and processing the first database operation request using the fourth interface object.

8. The method of claim 7, further comprising:
   if no interface object is both connected to the first database and assigned to the first transaction, if no interface object is connected to the first database but not currently being used for a transaction, and if there is no interface object not currently connected to any database, then selecting a third interface object that is connected to a database of the first database type but not currently being used for a transaction, disconnecting the third interface object from the database to which it was connected, connecting the third interface object to the first database, assigning the third interface object to the first transaction, updating the interface object status information for the third interface object, and processing the first database operation request using the third interface object.

9. The method of claim 8, wherein the third interface object comprises the interface object connected to a database of the first type but not currently being used for a transaction and that was least recently used to process any database operation request.

10. The method of claim 8, wherein the third interface object comprises an interface object selected randomly from those interface objects connected to a database of the first type but not currently being used for a transaction.

11. The method of claim 8, wherein the third interface object comprises the interface object that was connected to a database of the first type but not currently being used for a transaction and that was connected to a database that least recently received any database operation request.

12. The method of claim 8, wherein the third interface object comprises the interface object that was connected to a database of the first type but not currently being used for a transaction and, of interface objects satisfying this criteria, has the lowest activity level, where activity level is proportional to the number of times the interface object has been used during a particular time period and inversely proportional to the length of time that the interface object has been connected to a particular database.

13. The method of claim 7, further comprising:
   if no interface object is both connected to the first database and assigned to the first transaction, and if all interface objects are currently connected to a database and assigned to a transaction, then returning a message to the generator of the first database operation request that no connections are available.

14. The method of claim 7, further comprising:

if no interface object is both connected to the first database and assigned to the first transaction, and if all interface objects are currently connected to a database and assigned to a transaction, then waiting until an interface object is either connected to a database but not assigned to a transaction or until an interface object is not connected to a database and not assigned to a transaction.

15. The method of claim 1, further comprising:

receiving a message that the first transaction has been completed;

updating the status information of an interface object that was assigned to the first transaction to reflect that the interface object is no longer assigned to a transaction while maintaining the connection between that interface object and the first database.

16. A database connection management system, comprising:

a pool of interface objects, each interface object comprising an interface to a database of a first database type;

a database connection manager running on a computer and coupled to the pool of interface objects, the database connection manager operable to:

receive a first database operation request for a first database, the first database comprising a database of the first database type, the first database operation request comprising at least a portion of a first transaction, maintain, for each interface object, interface object status information indicating whether or not the interface object is connected to the first database and whether or not the interface object is currently being used for a transaction;

if a first interface object is connected to the first database and is assigned to the first transaction, then indicate that the first database operation request should be processed using the first interface object; and if no interface object is both connected to the first database and assigned to the first transaction and if a second interface object is connected to the first database but not currently being used for a transaction, then assign the second interface object to the first transaction, update the interface object status information for the second interface object, and indicate that the first database operation request should be processed using the second interface object.

17. The system of claim 16, wherein the database connection manager is further operable to:

if no interface object is both connected to the first database and assigned to the first transaction and if no interface object is connected to the first database but not currently being used for a transaction, then select a third interface object that is connected to a database of the first database type but not currently being used for a transaction, cause the disconnection of the third interface object from the database to which it was connected, cause the connection of the third interface object to the first database, assign the third interface object to the first transaction, update the interface object status information for the third interface object, and indicate that the first database operation request should be processed using the third interface object.

18. The system of claim 16, wherein the database connection manager is further operable to:

if no interface object is both connected to the first database and assigned to the first transaction, if no interface object is connected to the first database but not currently being used for a transaction, and if there is at least one interface object operable to be connected to a database of the first database type but not currently connected to any database and not currently being used for a transaction, then cause the connection of a fourth interface object, that is not currently connected to any database and not currently being used for a transaction, to the first database, assign the fourth interface object to the first transaction, update the interface object status information for the fourth interface object, and indicate that the first database operation request should be processed using the fourth interface object.

19. The system of claim 18, wherein the database connection manager is further operable to:

if no interface object is both connected to the first database and assigned to the first transaction, if no interface object is connected to the first database but not currently being used for a transaction, and if there is no interface object not currently connected to any database, then select a third interface object that is connected to a database of the first database type but not currently being used for a transaction, cause the disconnection of the third interface object from the database to which it was connected, cause the connection of the third interface object to the first database, assign the third interface object to the first transaction, update the interface object status information for the third interface object, and indicate that the first database operation request should be processed using the third interface object.

20. The system of claim 18, wherein the database connection manager is further operable to:

receive a message that the first transaction has been completed;

update the status information of an interface object that was assigned to the first transaction to reflect that the interface object is no longer assigned to a transaction while causing the connection between that interface object and the first database to be maintained.

* * * * *